United States Patent [19]

Shibata et al.

[11] Patent Number: 5,407,228
[45] Date of Patent: Apr. 18, 1995

[54] CONTROL SYSTEM FOR OCCUPANT RESTRAINT SYSTEM

[75] Inventors: Jun Shibata, Okegawa; Hiroaki Obayashi, Isehara; Makoto Kimura, Sagamihara; Shuzo Fukuzumi, Zama; Hironori Yoshikawa, Isehara; Atsushi Hitotsumatsu, Zama; Yukio Hashimoto, Sagamihara; Toshimi Yamanoi, Isehara; Seiji Takaya, Zama, all of Japan

[73] Assignee: Nissan Motor Co., Ltd., Yokohama, Japan

[21] Appl. No.: 178,171

[22] Filed: Jan. 6, 1994

[30] Foreign Application Priority Data

Jan. 25, 1993 [JP] Japan .................................. 5-010278

[51] Int. Cl.6 ............................................. B60R 21/32
[52] U.S. Cl. ..................................... 280/735; 180/282; 364/424.05
[58] Field of Search .................. 280/735, 734, 728 R; 180/282, 271; 364/424.05; 340/436, 438; 307/10.1

[56] References Cited

U.S. PATENT DOCUMENTS 5,068,793 11/1991 Condne et al. ...................... 280/735
5,081,587 1/1992 Okano .................................. 280/735
5,122,954 6/1992 Okano .................................. 280/735
5,262,949 11/1993 Okano et al. ....................... 280/735

FOREIGN PATENT DOCUMENTS 63-503531 12/1988 Japan .
2212238 8/1990 Japan .................................. 280/735
4221251 8/1992 Japan .................................. 280/735

Primary Examiner—Margaret A. Focarino
Assistant Examiner—Peter C. English
Attorney, Agent, or Firm—Lowe, Price, LeBlanc & Becker

[57] ABSTRACT

A control system for an occupant restraint system including an airbag which is mounted on an automotive vehicle to protect a vehicle occupant from coming into direct contact with a steering wheel and/or a windshield. The control system comprises a control circuit including a microcomputer. The microcomputer is adapted to execute the following control. A decision is made to operate (inflate) the airbag when a vehicle deceleration exceeds a predetermined threshold level. The threshold level is changed at a timing which is set in accordance with a physical amount representative of a deceleration condition of the vehicle, thereby securely operating the airbag merely by making a simple adjustment to the control system.

5 Claims, 18 Drawing Sheets

CONTROL SYSTEM FOR OCCUPANT RESTRAINT SYSTEM

BACKGROUND OF THE INVENTION

1. Field of the Invention

This invention relates to improvements in a control system for an occupant restraint system arranged to protect a vehicle occupant at a vehicle collision.

2. Description of the Prior Art

A variety of control systems for an occupant restraint system have been proposed and put into practical use in the field of automotive vehicle. The occupant restraint system includes an airbag and/or a seat belt assembly to protect a vehicle occupant from coming into direct contact with a steering wheel and/or a windshield. One type of control systems is arranged to operate the occupant restraint system to protect the vehicle occupant when a deceleration detected by a deceleration sensor exceeds a predetermined threshold level. Another type of control system is arranged to operate the occupant restraint system when an integrated value reaches a predetermined threshold level, the integrated value being obtained by integrating a value obtained by subtracting an integration offset from a deceleration of the vehicle, as disclosed, for example, in Japanese Patent Provisional Publication No. 63-503531.

However, the above conventional control systems require delicate adjustment of the threshold level and/or the integration offset in accordance with a variety of modes of vehicle collision. This makes the adjustment of the control system complicated, requiring a long time for the adjustment.

SUMMARY OF THE INVENTION

It is an object of the present invention to provide an improved control system for an occupant restraint system, which can overcome drawbacks encountered in conventional control systems for an occupant restraint system.

Another object of the present invention is to provide an improved control system for an occupant restraint system, which can precisely operate the occupant restraint system to protect a vehicle occupant with respect to a variety of modes of vehicle collisions, merely by making a simple adjustment to the control system.

An aspect of the present invention resides in a control system for an occupant restraint system mounted on a vehicle, as illustrated in principle in FIG. 1A. The control system comprises first or deceleration detecting means 100 for detecting a deceleration of the vehicle. Second or operation deciding means 101 is provided to make a decision to operate the occupant restraint system when the deceleration exceeds a predetermined threshold level. Third or physical amount calculating means 102 is provided to calculate a physical amount representative of a deceleration condition of the vehicle. Fourth or changing timing setting means 103 is provided to set a changing timing am which the threshold level is changed, in accordance with the physical amount. Fifth or level changing means 104 is adapted to change the threshold level at the changing timing.

With this arrangement, the changing timing at which the threshold level is changed is set in accordance with the physical amount representative of the vehicle deceleration condition. The threshold level is changed at the set timing, and the operation of the occupant restraint system is decided when the vehicle deceleration exceeds the threshold level which is before or after changing. Accordingly, the occupant restraint system can be precisely operated to protect a vehicle occupant with respect to a variety of modes of vehicle collision, merely by making a simple adjustment to the control system.

Another aspect of the present invention resides in a control system for an occupant restraint system mounted on a vehicle, as illustrated in principle in FIG. 1B. The control system comprises first or deceleration detecting means 200 for detecting a deceleration of the vehicle. Second or integrating means 201 is provided to integrate a value obtained by subtracting a predetermined integration offset from the deceleration, to obtain an integrated value. Third or operation deciding means 202 is provided to make a decision to operate the occupant restraint system, when the integrated value exceeds a predetermined threshold level. Fourth or physical amount calculating means 203 is provided to calculate a physical amount representative of a deceleration condition of the vehicle. Fifth or changing timing setting means 204 is provided to set a changing timing at which the integration offset is changed, in accordance with the physical amount. Additionally, sixth or integration offset changing means 205 is provided to change the integration offset at the changing timing.

With this arrangement, the changing timing at which the integration offset is changed is set in accordance with the physical amount representative of the vehicle deceleration condition. The integration offset is changed at the changing timing. Additionally, integration is made on the value obtained by subtracting the integration offset (which is before or after changing) from the vehicle deceleration to obtain the integrated value. The decision to operate the occupant restraint system is made when the integrated value exceeds the predetermined threshold level. Accordingly, the occupant restraint system can be precisely operated to protect the vehicle occupant with respect to a variety of modes of vehicle collision, merely by making a simple adjustment to the control system.

DETAILED DESCRIPTION OF THE INVENTION

Figure 1A:
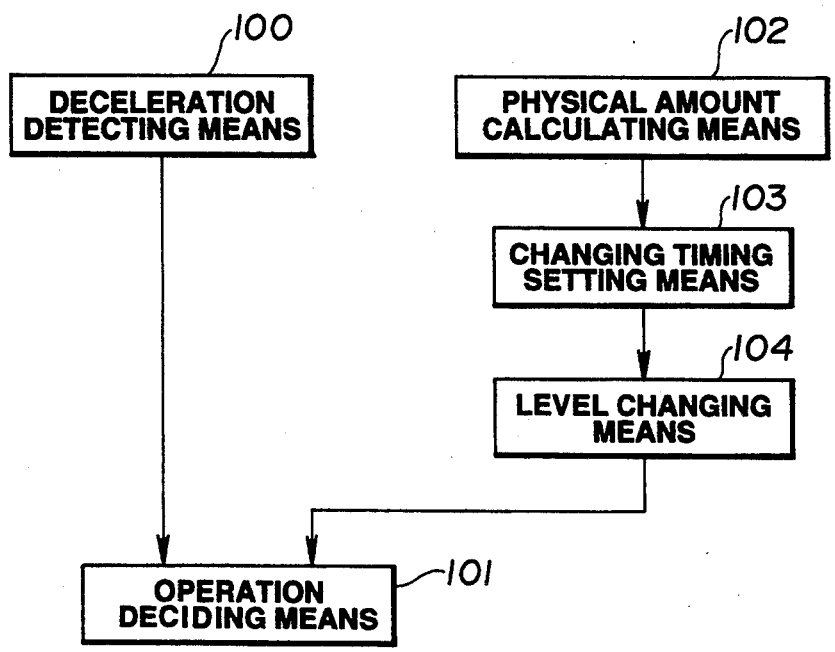
FIG. 1A is a block diagram showing the principle of an aspect of the present invention.
Figure 1B:
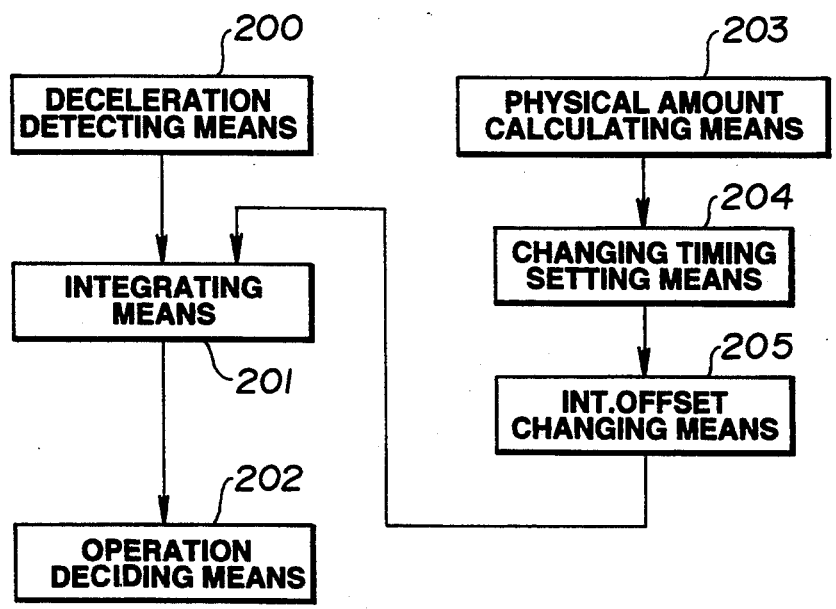
FIG. 1B is a block diagram showing the principle of another aspect of the present invention.
Figure 2:
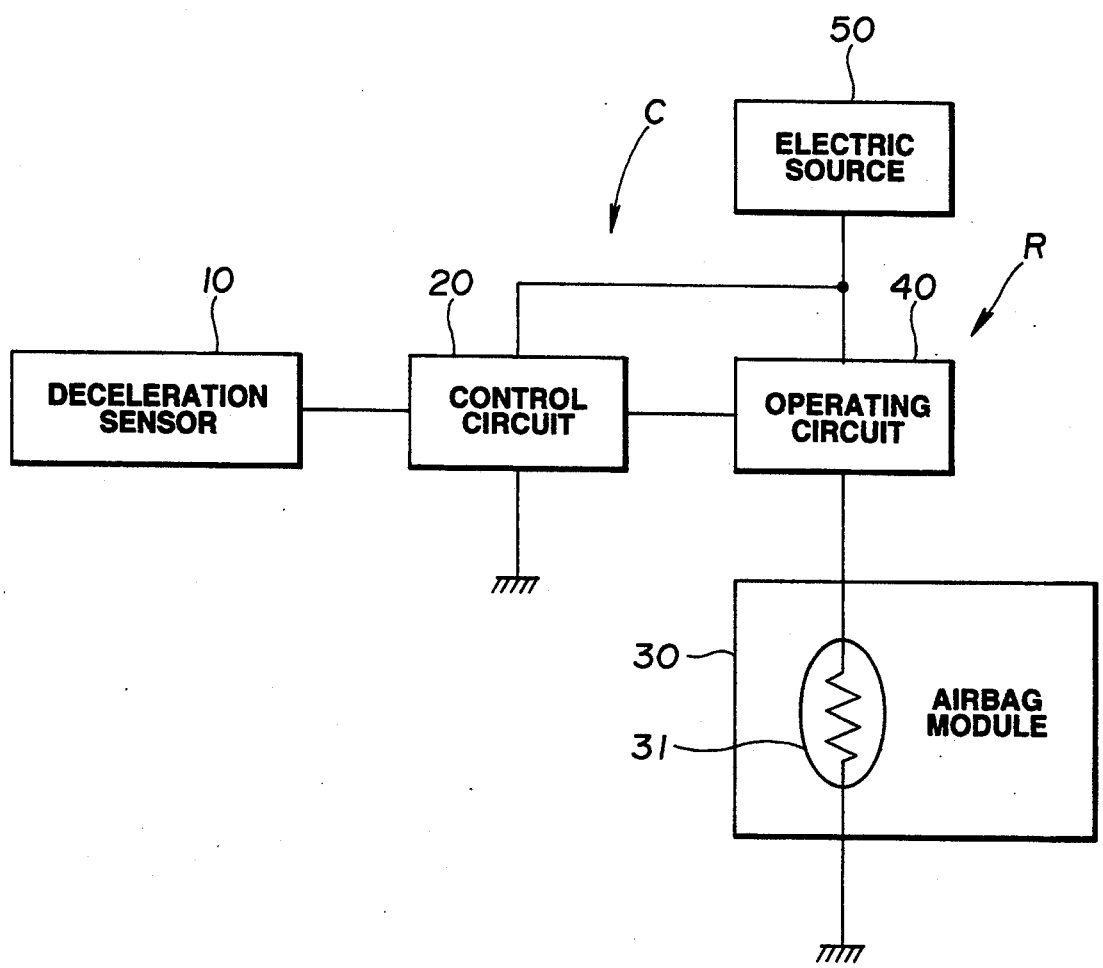
FIG. 2 is a block diagram of a control system of the present invention, for an occupant restraint system.

Referring now to FIGS. 2 to 7, more specifically FIG. 2, of the drawings, a first embodiment of a control system C of the present invention forms part of an occupant restraint system R for protecting a vehicle occupant(s) from coming into direct contact with either a steering wheel, a windshield and/or the like upon a vehicle collision or the like.

An arrangement of the first embodiment control system C of the present invention is shown in FIG. 2. The control system C comprises a deceleration sensor 10 which is adapted to detect a deceleration G of an automotive vehicle (not shown) on which the occupant restraint system R is mounted, and to output a signal representative of the deceleration G to a control circuit 20. The control circuit 20 includes a microcomputer and its peripherals though not shown, and adapted to control operation of an airbag module 30 upon execution of a control program which will be discussed hereinafter. In this embodiment, an airbag module 30 is stored in a central pad of a steering wheel of an automotive vehicle though not shown, so that the airbag module 30 protects a driver on a driver's seat. The airbag module 30 includes an airbag which can inflate and develop to protect a vehicle occupant from coming into direct contact with the steering wheel, the windshield and/or the like upon a vehicle collision. The airbag module 30 further includes an inflator (not shown) for causing the airbag to inflate, and a squib 31 or electrical firing device for the inflator. An operating circuit 40 is electrically connected between the squib 31 and an electric source or battery 50 so that electric current can be supplied from the electric source 50 to the squib 31. Additionally, the operating circuit 40 is electrically connected to the control circuit 20. The electric source 50 is electrically connected also to the control circuit 20.

Figure 3:
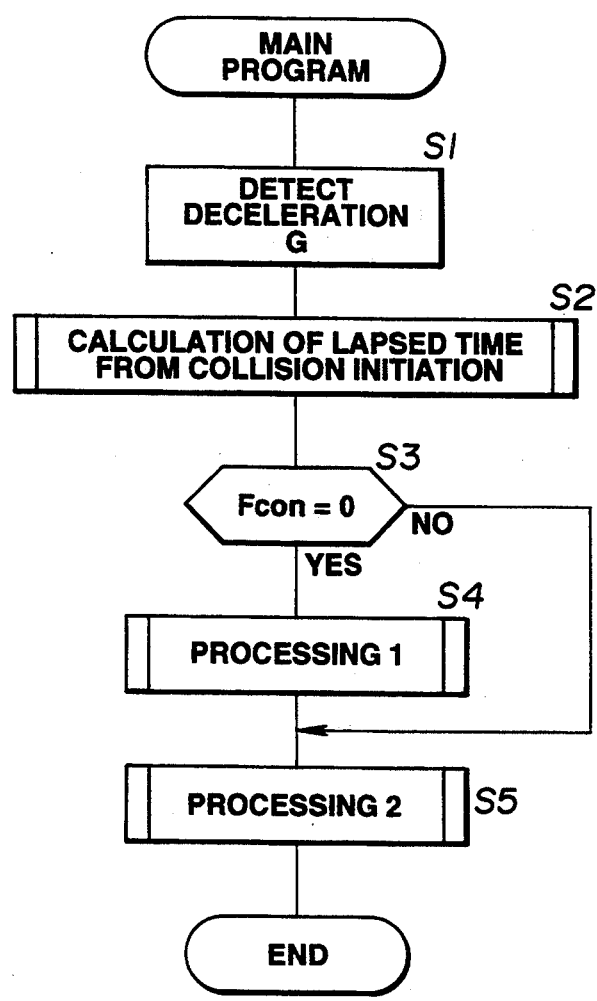
FIG. 3 is a flowchart showing a main program of a control executed by a microcomputer in the control system of FIG. 2, illustrating a first embodiment of the control system of the present invention.

The microcomputer of the control circuit 20 executes the control of a main program shown as the form of a flowchart in FIG. 3. The operation of the first embodiment control system C will be discussed with reference to the flowchart of FIG. 3.

At a step S1, a deceleration G of the vehicle is detected by the deceleration sensor 10. Then, a flow goes to a step S2 to execute a routine of calculating a lapsed time from the initiation of a vehicle collision as shown in FIG. 4.

Figure 4:
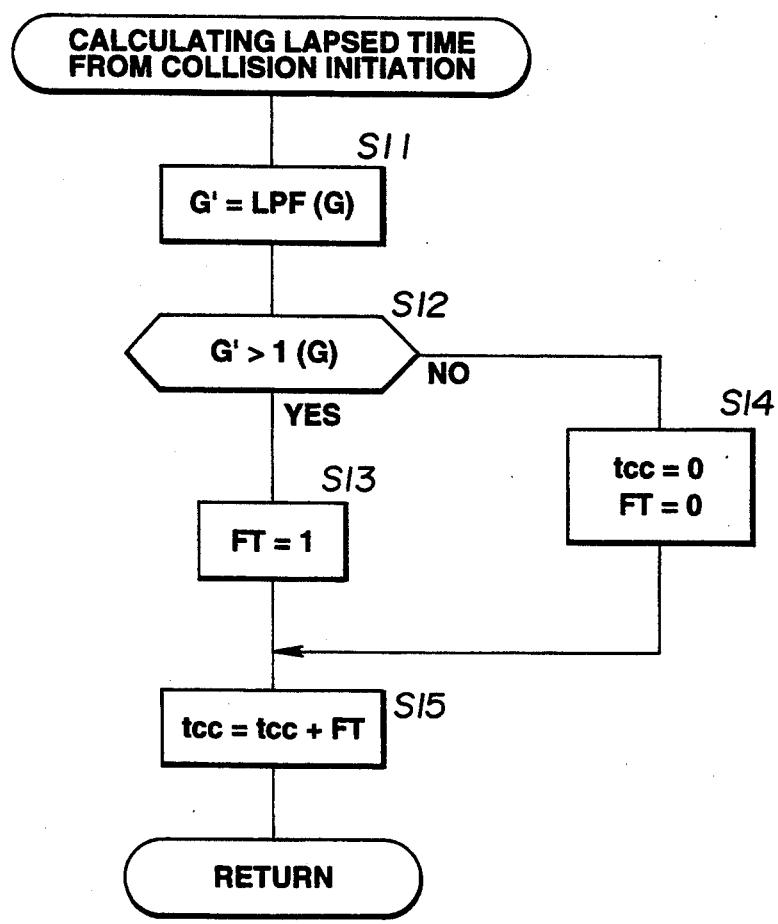
FIG. 4 is a flowchart showing a routine of calculating a lapsed time from the initiation of a vehicle collision, in the main program of FIG. 3.

In the routine of FIG. 4, at a step S11 the detected deceleration G is subjected to a lowpass filter processing using a lowpass filter (LPF) thus obtaining a deceleration G'. At a subsequent step S12, a decision is made as to whether the deceleration G' is larger than, for example, 1 (G) or not. If larger, the flow goes to a step S13. If not larger, the flow goes to a step S14. At the step S13, 1 is set at a flag FT. At the step S14, zero (0) is set at a lapsed time tcc (from the initiation of the vehicle collision) and at the flag FT. At a subsequent step S15, the flag FT is added to the lapsed time tcc (from the initiation of the vehicle collision) thereby to renew the lapsed time tcc, and then the flow returns to the main program of FIG. 3.

Upon returning to the main program, at a step S3, a decision is made as to whether a flag Fcon is zero (0) or not. If zero, the flow goes to a step S4. If not zero, the flow skips over the step S4 and goes to a step S5. At the step S4, a subroutine of Processing 1 shown in FIG. 5 is performed thereby to decide a time point (timing) TC at which a threshold level THL of the deceleration G is changed, in accordance with an integrated value SG of the deceleration G at a time point at which a predetermined time Maxt has lapsed from the initiation of the vehicle collision.

Figure 5:
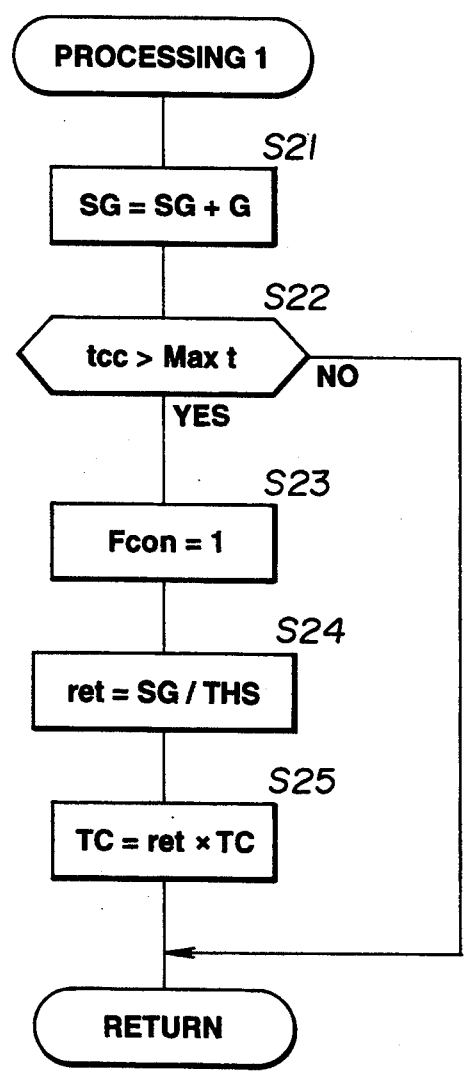
FIG. 5 is a flowchart showing a subroutine of Processing 1 in the main program of FIG. 3.

In the subroutine of FIG. 5, at a step S21, a deceleration G which has been detected at the current time (such as the current computer computing cycle) is added to a deceleration integrated value SG obtained up to a prior time (such as the immediately preceding computer computation cycle) thereby obtaining a new deceleration integrated value SG. At a subsequent step S22, a decision is made as to whether the lapsed time tcc exceeded the predetermined time Maxt or not. If exceeds, the flow goes to a step S23. If not exceeds, the flow returns to the main program. At the step S23, 1 is set at the flag Fcon, and then the flow goes to a step S24 at which a ratio ret between the deceleration integrated value SG and a predetermined value THS is obtained. At a step S25, a predetermined time TC for changing the deceleration threshold level THL is multiplied by the ratio ret so as to be changed. It is to be noted that the time point (TC+Maxt) obtained by adding the predetermined lapsed time Maxt (from the vehicle collision initiation) to the predetermined changing time point TC after being changed corresponds to a time point (timing) at which the threshold level THL is changed on a standard or the time point of the vehicle collision initiation. The threshold level THL is a standard value for deciding as to whether the airbag is operated (inflated) or not. In this embodiment, when the deceleration G exceeds the threshold level THL, a decision is made to operate (inflate) the airbag. When the above processing is completed, the flow returns to the main program of FIG. 3.

Figure 6:
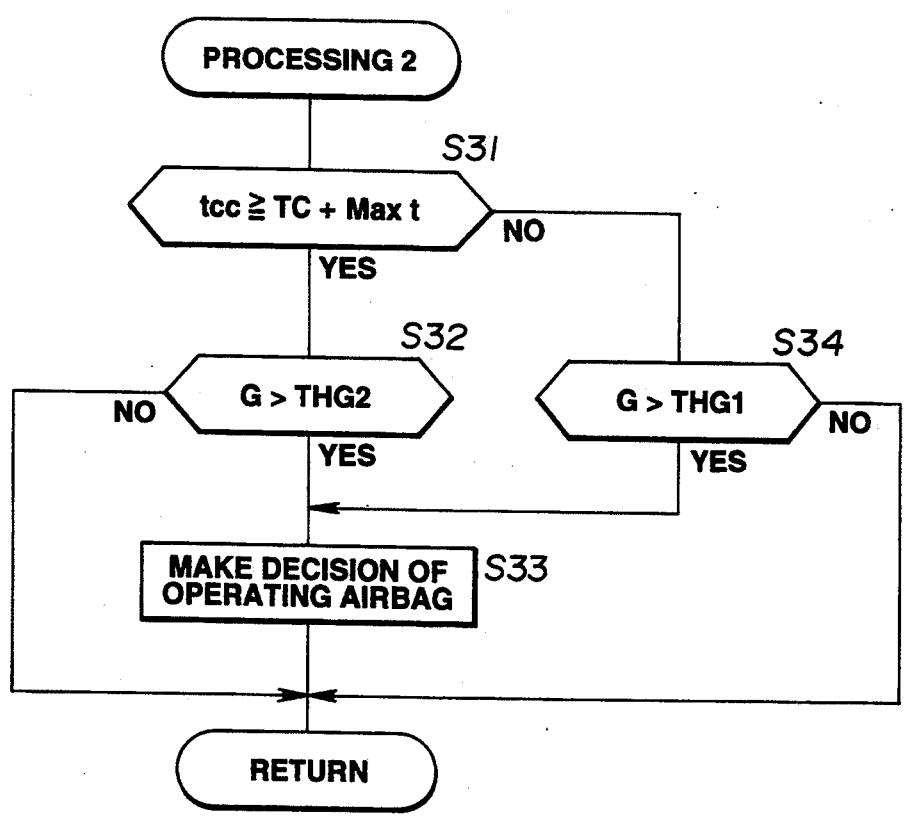
FIG. 6 is a flowchart showing a subroutine of Processing 2 in the main program of FIG. 3.

After returning to the main program, an a step S5, a subroutine of Processing 2 shown in FIG. 6 is performed to make a decision as to whether the airbag is operated (inflated) or not upon comparison of the deceleration G with a threshold level THG1 or THG2.

More specifically, at a step S31, a decision is made as to whether the changing time point (TC+Maxt) for the threshold level THL has been reached or not. If reached, the flow goes to a step S32. If not reached, the flow goes to a step S34. At the step S32, a decision is made as to whether the deceleration G is larger than the threshold level THG2 or not. If larger, the flow goes to a step S33. If not larger, the flow returns to the main program of FIG. 3. At the step S34 or before the changing time point for the threshold level THL, a decision is made as to whether the deceleration G is larger than the threshold level THG1 or not. If larger, the flow goes to a step S33. If not larger, the flow returns to the main program. Here, the threshold levels THG1, THG2 are set to be in a relationship of THG1>THG2. At the step S33, since the deceleration exceeds the threshold level THG1 or THG2, a decision is made to operate or inflate the airbag, so that the control circuit 20 outputs an operating signal to the operating circuit 40. As a result, the operating circuit 40 causes electric current to be supplied from the electric source 50 to the squib 31. Then, the squib 31 fires the inflator thereby inflating and developing the airbag.

Figure 7:
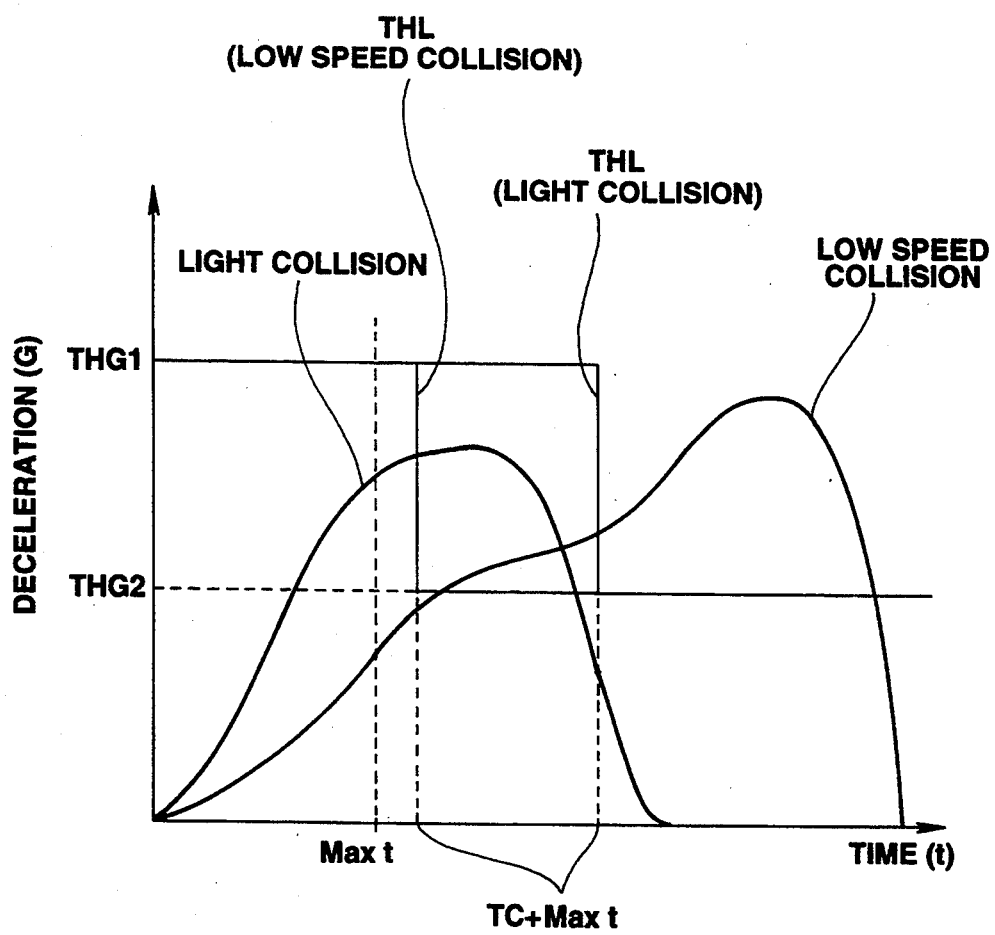
FIG. 7 is a graph showing variations in deceleration G for two vehicle collision modes.
Figure 8:
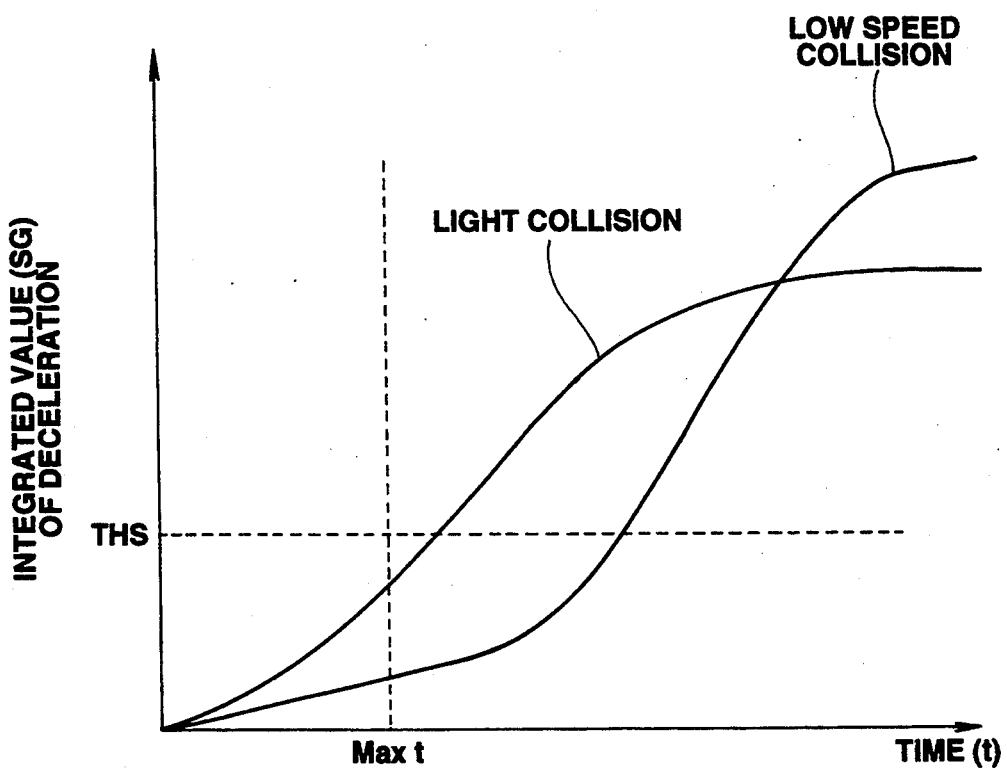
FIG. 8 is a graph showing variations in deceleration integrated value SG for the two vehicle collision modes.

Hereinafter, advantageous effects of the first embodiment control system C will be discussed with reference to FIGS. 7 and 8. FIG. 7 depicts variations in the deceleration G during a vehicle collision. FIG. 8 depicts variations in the integrated value SG of the deceleration G.

Explanation will be made, for example, on two types of vehicle collisions. One of them is a case in which the deceleration G relatively quickly increases immediately after the vehicle collision and then quickly decreases, in which the impact of the collision is relatively small and therefore no operation (inflation) of the airbag is necessary. Such type of vehicle collision is referred hereinafter to as a "light collision". The other of them is a case in which the deceleration G relatively gradually increases immediately after the vehicle collision and thereafter largely increases, in which the impact of the collision is large and therefore the operation (inflation) of the airbag is necessary to securely protect the vehicle occupant. Such type of vehicle collision is referred hereinafter to as a "low speed collision".

As apparent from FIG. 8, the ratio ret at the time point at which the time Maxt has lapsed from the initiation of the vehicle collision is smaller in the low speed collision than that in the light collision, so that the changing time point TC in the low speed collision is advanced relative to that in the light speed collision. Accordingly, the threshold level THL in the low speed collision is changed early as compared with that in the light speed collision. As shown in FIG. 7, in case of the light collision, it is judged or decided that no operation (inflation) of the airbag is necessary, because the deceleration G is lower than the threshold level THG2 even upon changing the threshold level from THG1 to THG2. In case of the low speed collision, it is judged or decided to operate (inflate) the airbag, because the deceleration G exceeds the threshold level THG2 upon changing the threshold level from THG1 to THG2.

Thus, the first embodiment control system is arranged such that the time point at which the threshold level THL of the deceleration G is changed is set in accordance with the integrated value of the deceleration G representative of a deceleration condition of the vehicle; and the airbag is operated when the deceleration G exceeds the threshold level THL at its state before being changed or after being changed. Therefore, the airbag can be precisely and securely operated (inflated) with respect to a variety of vehicle collisions merely upon making simple adjustment to the control system.

Figure 9:
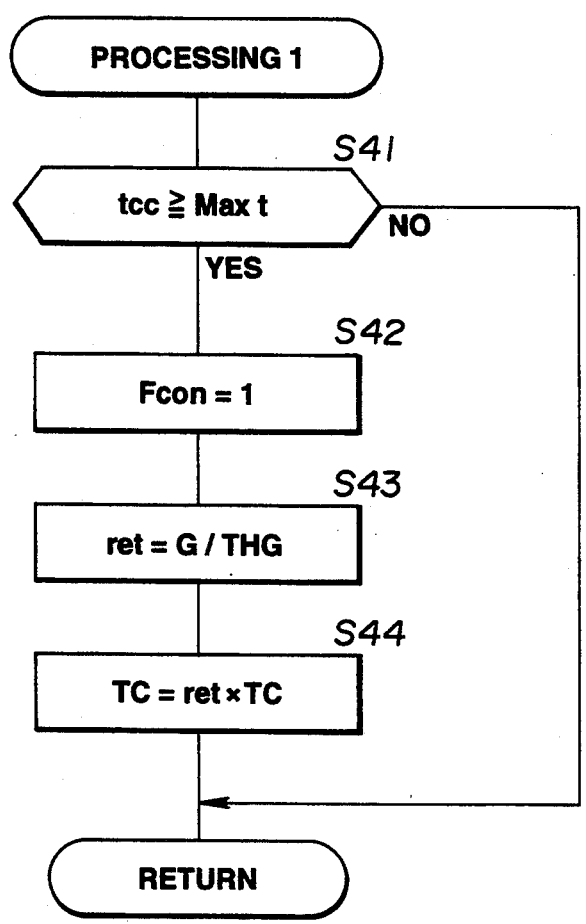
FIG. 9 is a flowchart showing a subroutine of Processing 1 in the main program of FIG. 3, but illustrating a second embodiment of the control system of the present invention.
Figure 10:
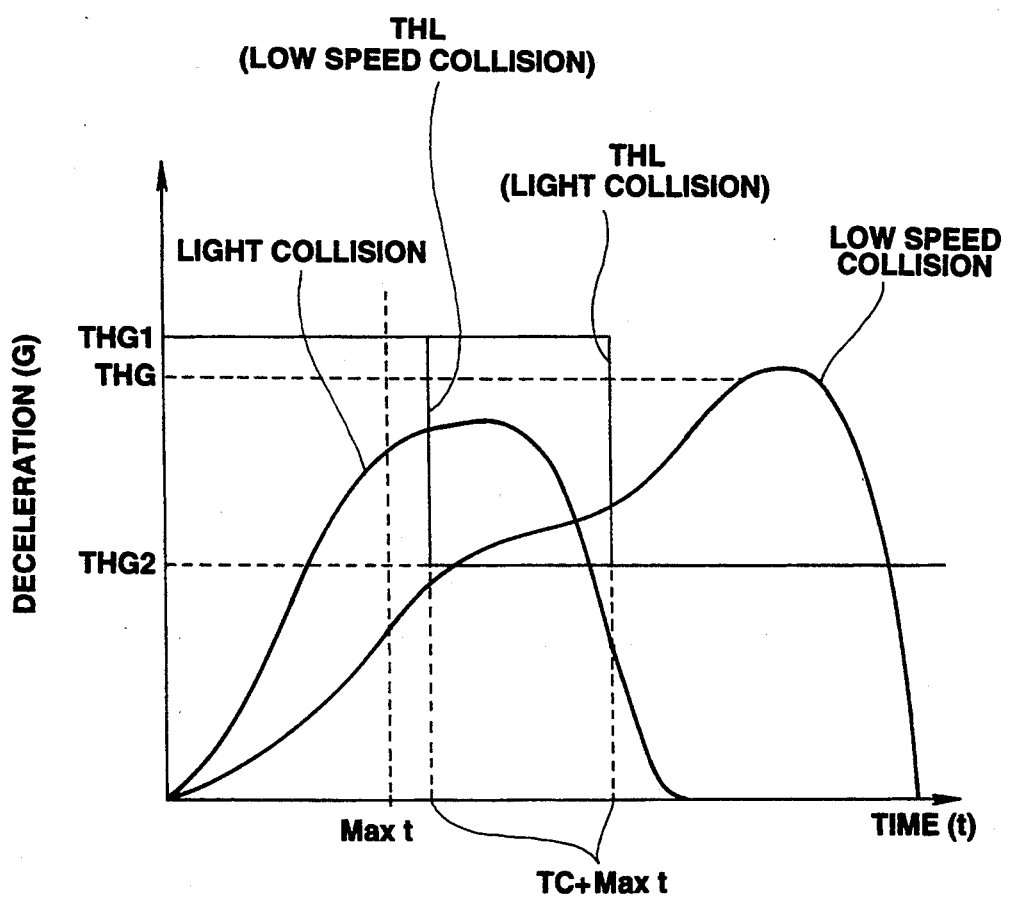
FIG. 10 is a graph similar to FIG. 7 but showing the similar variations in the second embodiment.

FIGS. 9 and 10 illustrate a second embodiment of the control system C in accordance with the present invention. The second embodiment control system C is similar to the first embodiment control system C with the exception that the time point at which the threshold level THL of the deceleration G is changed is set in accordance with the deceleration G. In this connection, the same timing is set in accordance with the deceleration integrated value SG in the first embodiment control system C. Accordingly, the arrangement of the second embodiment control system C is the same as that of the first embodiment control system C shown in FIG. 2, and therefore explanation thereof is omitted for the purpose of simplicity of illustration. Additionally, a control program of the second embodiment control system C is the same as that of the first embodiment control system C except for the subroutine of Processing 1, and therefore the control programs shown in FIGS. 3, 4 and 6 are common in the control program of the second embodiment. In view of this, discussion of the second embodiment control system will be made mainly according to a subroutine of Processing 1 shown in FIG. 9 which subroutine is different from that of the first embodiment control system C shown in FIG. 5.

FIG. 9 depicts the subroutine of Processing 1 of the second embodiment control system. The microcomputer of the control circuit 20 executes the subroutine of FIG. 9 thereby to decide a time point TC at which the threshold level THL is changed, in accordance with the deceleration G at a time point (timing) at which the time Maxt has lapsed from the initiation of the vehicle collision.

More specifically, at a step S41, a decision is made as to whether the time Maxt has lapsed from the initiation of the vehicle collision or not. If lapsed, the flow goes to a step S42. If not lapsed, the flow returns to the main program shown in FIG. 3. At a step S42, 1 is set at the flag Fcon, and then the flow goes to a step S43 at which the ratio ret between the deceleration G and the predetermined value THG is obtained. At a step S44, the predetermined time point TC for changing the threshold level THL is multiplied by the ratio ret, so that the time point is changed. When the above processing is completed, the flow returns to the main program of FIG. 3.

Advantageous effects of the second embodiment control system will be discussed with reference to FIG. 10 which depicts variations in deceleration G with respect to the light collision and the slow speed collision.

As apparent from FIG. 10, the ratio ret at the time point at which the time Maxt has lapsed from the initiation of the vehicle collision is smaller in the low speed collision than that in the light collision, so that the changing time point TC in the low speed collision is advanced relative to that in the light speed collision. Accordingly, the threshold level THL in the low speed collision is changed early as compared with that in the light speed collision. In case of the light collision, it is judged or decided that no operation (inflation) of the airbag is necessary, because the deceleration G is lower than the threshold level THG2 even upon changing the threshold level from THG1 to THG2. In case of the low speed collision, it is judged or decided to operate (inflate) the airbag, because the deceleration G exceeds the threshold level THG2 upon changing the threshold level from THG1 to THG2.

Thus, the second embodiment control system is arranged such that the time point at which the threshold level THL of the deceleration G is changed is set in accordance with the deceleration G representative of a deceleration condition of the vehicle; and the airbag is operated when the deceleration G exceeds the threshold level THL in its state before being changed or after being changed. Therefore, the airbag can be precisely and securely operated (inflated) with respect to a variety of vehicle collisions merely upon making simple adjustment to the control system. This embodiment can omit the integrating processing of the deceleration G made in the first embodiment control system, thereby lightening the load of the microcomputer as compared with the first embodiment control system C.

Figure 11:
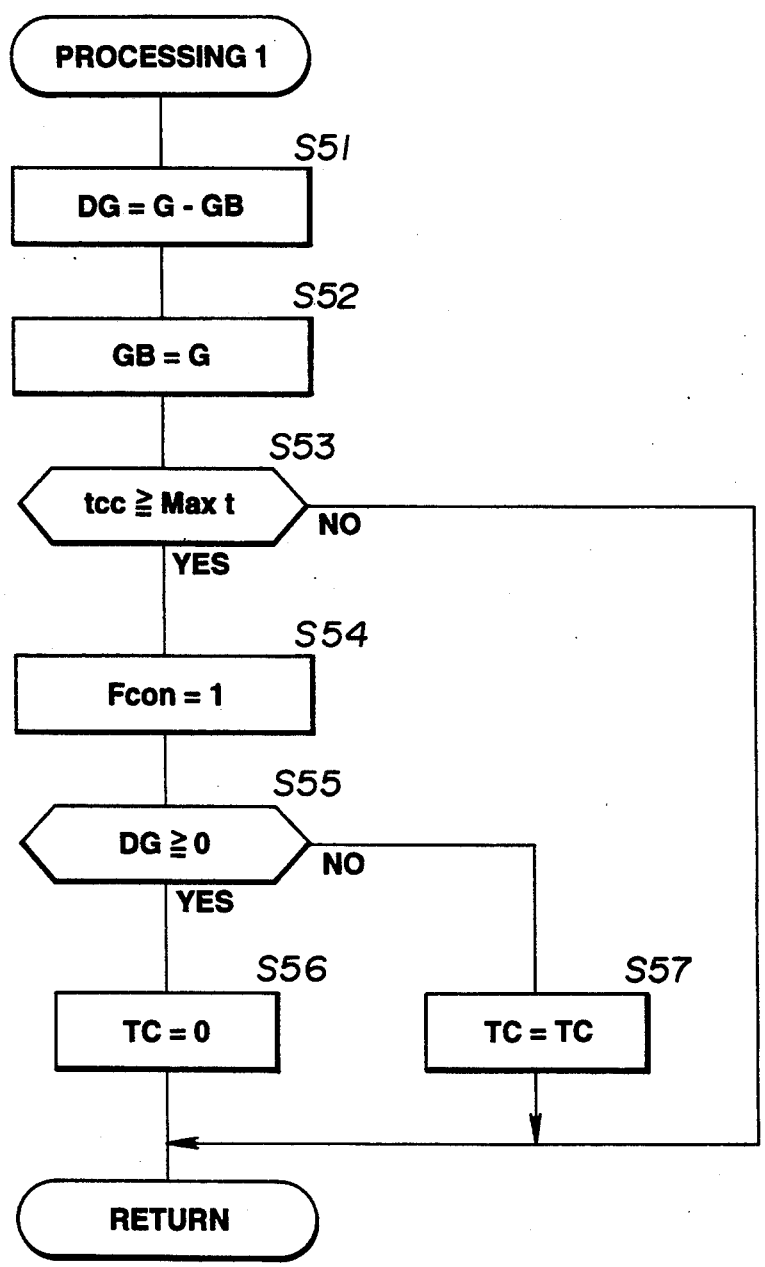
FIG. 11 is a flowchart showing a subroutine of Processing 1 in the main program of FIG. 3, but illustrating a third embodiment of the control system of the present invention.
Figure 12:
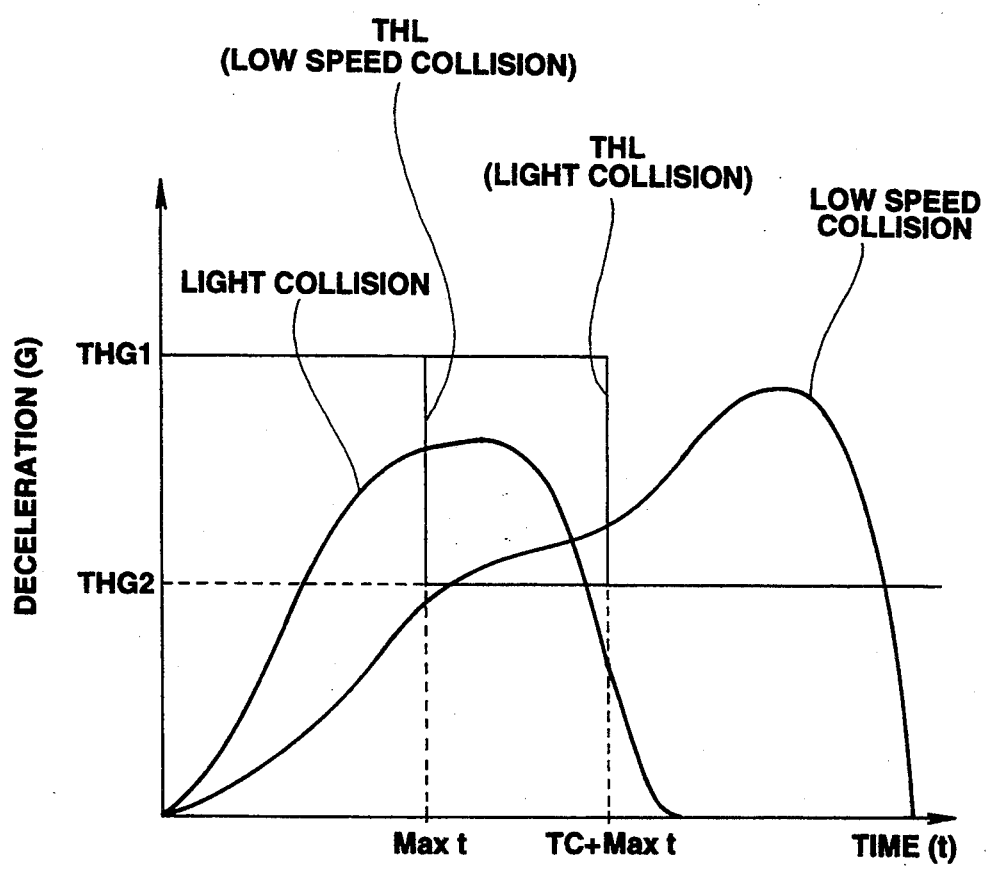
FIG. 12 is a graph similar to FIG. 7 but showing similar variations in the third embodiment.
Figure 13:
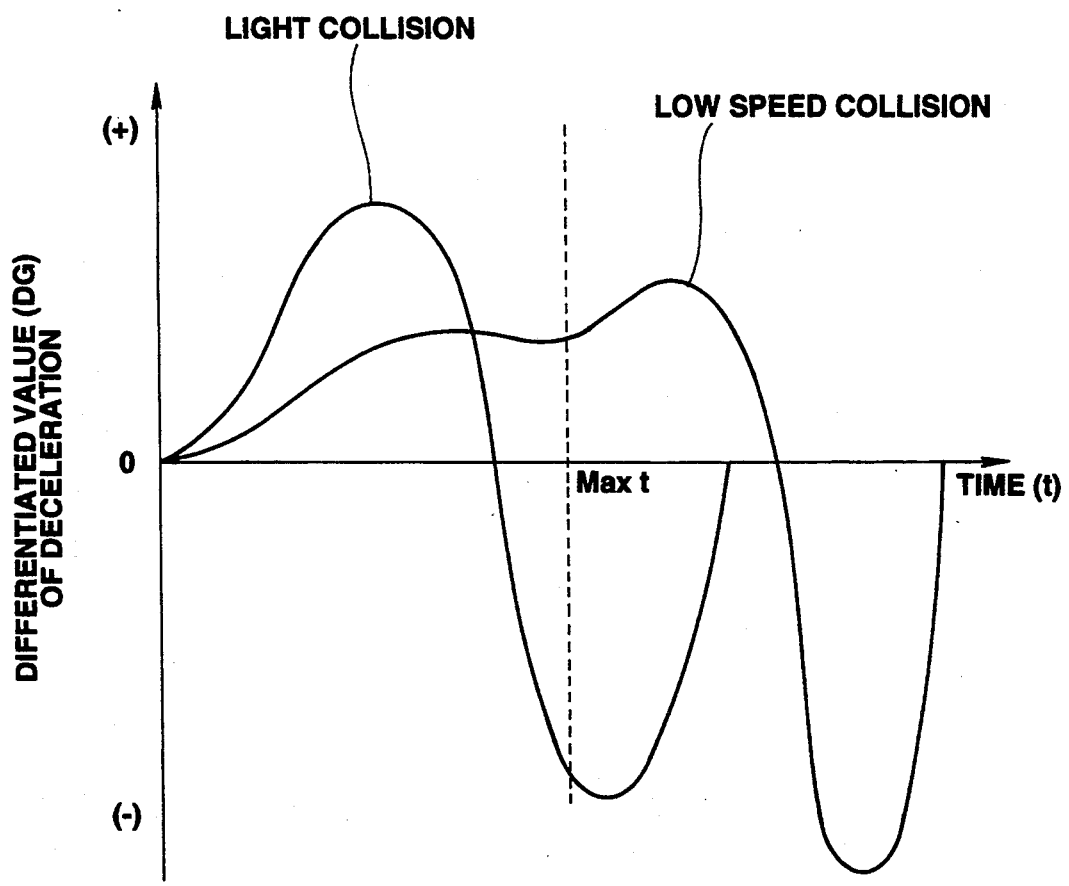
FIG. 13 is a graph showing variations in deceleration differentiated value DG for two vehicle collision modes in connection with the third embodiment.

FIGS. 11, 12 and 13 illustrate a third embodiment of the control system in accordance with the present invention. The third embodiment control system is similar to the first embodiment control system C with the exception that the time point at which the threshold level THL of the deceleration G is changed is set in accordance with a differentiated value DG of the deceleration G. Accordingly, the arrangement of the second embodiment control system C is the same as that of the first embodiment control system C shown in FIG. 2, and therefore explanation thereof is omitted for the purpose of simplicity of illustration. Additionally, a control program of the third embodiment control system C is the same as that of the first embodiment control system C except for the subroutine of Processing 1, and therefore the control programs shown in FIGS. 3, 4 and 6 are common in the control program of the third embodiment. In view of this, discussion of the third embodiment control system will be made mainly according to a subroutine of Processing 1 shown in FIG. 11 which subroutine is different from that of the first embodiment control system C shown in FIG. 5.

FIG. 11 depicts the subroutine of Processing 1 of the second embodiment control system. The microcomputer of the control circuit 20 executes the subroutine of FIG. 11 thereby to decide a time point (timing) TC at which the threshold level THL is changed, in accordance with the differentiated value DG of the deceleration G at a time point (timing) at which the time Maxt has lapsed from the initiation of the vehicle collision.

More specifically, at a step S51, a deceleration GB detected at the prior time (such as the immediately preceding computer computation cycle) is subtracted from the deceleration G detected at the current time (such as the current computer computing cycle) to obtain a difference in deceleration between the prior time and the current time, i.e., a differentiated value DG of the deceleration G. At a subsequent step S52, the deceleration G detected at the current time is set for the deceleration GB, and then the flow goes to a step S53. At the step S53, a decision is made as to whether the lapsed time tcc exceeds the time Maxt or not. If exceeded, the flow goes to a step S54. If not exceeded the flow returns to the main program of FIG. 3. At the step S54, 1 is set at the flag Fcon, and then the flow goes to a step S55 in which a decision is made as to whether the deceleration differentiated value DG is positive or nom, i.e., the deceleration G is increasing or not. If the deceleration G is increasing, the flow goes to a step S56. If not increasing, the flow goes to a step S57. At the step S56, 0 is set for the changing time point TC for the threshold level THL. At the step S57, a predetermined value is set, as it is, for the changing time point TC, and then the flow returns to the main program.

Advantageous effects of the third embodiment control system will be discussed with reference to FIG. 12 which shows variations in deceleration G with respect to the light collision and the low speed collision and to FIG. 13 which shows variations in the differentiated value DG of the deceleration G in FIG. 12.

As shown in FIG. 13, the differentiated value DG of the deceleration G at the time point at which the time Maxt has lapsed from the initiation of the vehicle collision is negative in case of the light collision and positive in the case of the low speed collision. Accordingly, the threshold level THL in the low speed collision is changed early as compared with that in the light speed collision. In case of the light collision, it is judged or decided that no operation (inflation) of the airbag is necessary, because the deceleration G is lower than the threshold level THG2 even upon changing the threshold level from THG1 to THG2. In case of the low speed collision, it is judged or decided to operate (inflate) the airbag, because the deceleration G exceeds the threshold level THG2 upon changing the threshold level from THG1 to THG2.

Thus, the third embodiment control system is arranged such that the time point at which the threshold level THL of the deceleration G is changed is set in accordance with the differentiated value of the deceleration G representative of a deceleration condition of the vehicle; and the airbag is operated when the deceleration G exceeds the threshold level THL in its state before being changed or after being changed. Therefore, the airbag can be precisely and securely operated (inflated) with respect to a variety of vehicle collisions merely upon making simple adjustment to the control system. Additionally, the differentiating processing of the deceleration G is simple in calculation as compared with the integrating processing of the same, thereby lightening the load of the microcomputer as compared with the first embodiment control system C.

FIGS. 14 to 18 illustrate a fourth embodiment of the control system C according to the present invention, in which the time point at which an integration offset (a changeable value for setting a base point or standard for integration) of the deceleration G is changed is set in accordance with the integrated value SG of the deceleration G; integration is made on a value obtained by subtracting the integration offset at its state before being changed or after being changed, from the detected deceleration G; and the airbag is operated when the deceleration integrated value SG exceeds a threshold level.

The arrangement of the fourth embodiment control system is the same as that of the first embodiment control system C shown in FIG. 2, and therefore explanation thereof is omitted for the purpose of simplicity of illustration.

Figure 14:
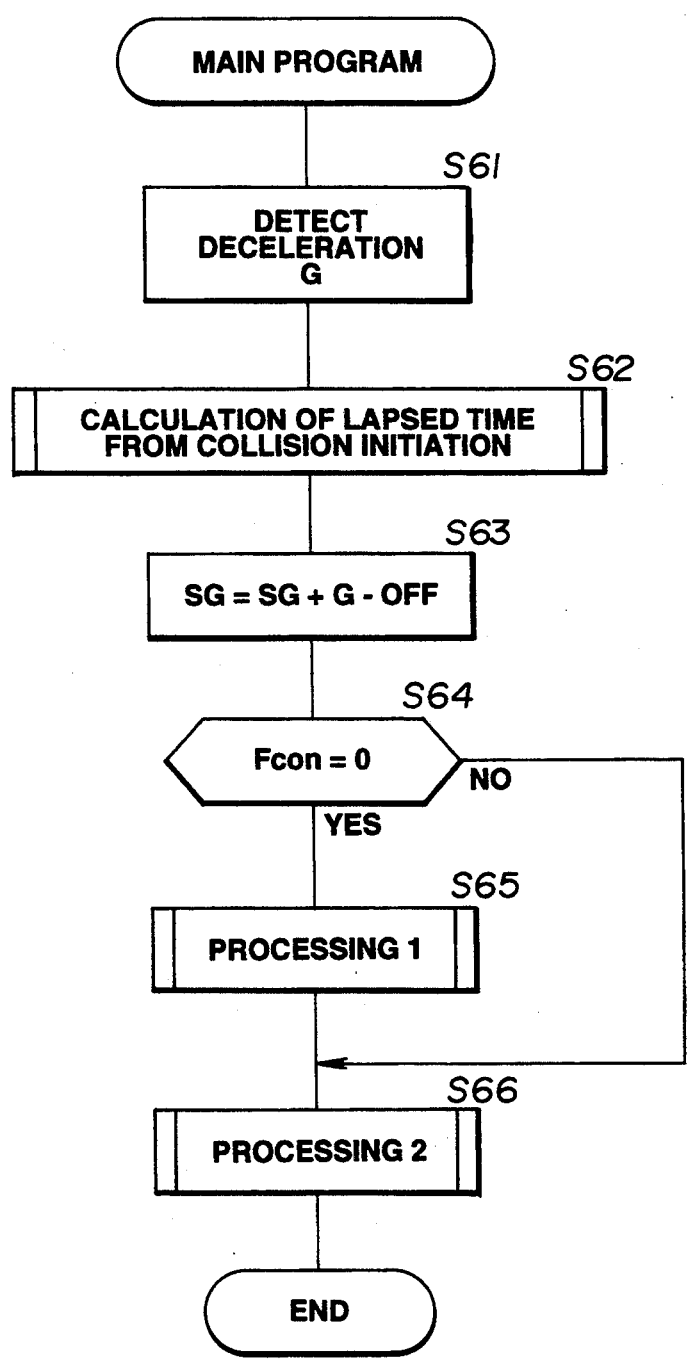
FIG. 14 is a flowchart showing a main program of a control executed by a microcomputer in a fourth embodiment of a control system according to the present invention.

In this embodiment, the microcomputer of the control circuit 20 of the control system C executes the control of a main program shown in FIG. 14. The operation of the control system C of this embodiment will be discussed with reference to a flowchart of FIG. 14.

At a step S61, the deceleration G of the vehicle is detected by the deceleration sensor 10. At a subsequent step S62, the subroutine shown in FIG. 4 is performed thereby to obtain the lapsed time tcc (from the initiation of the vehicle collision). At a step S63, an integration offset OFF is subtracted from the deceleration G detected at the current time (such as the current computer computation cycle) to obtain a value. This value is added to the integrated value SG obtained up to the prior time (such as the immediately preceding computer computation cycle) thus obtaining an integrated value SG of the deceleration G. Subsequently, at a step S64, a decision is made as to whether the flag Fcon is at zero (0) or not. If at zero, a flow goes to a step S65. If not at zero, the flow skips over the step S66. At the step S65, a subroutine of Processing 1 shown in FIG. 15 is performed in which a time point (timing) TC at which the integration offset OFF is changed is decided in accordance with the deceleration integrated value SG.

Figure 15:
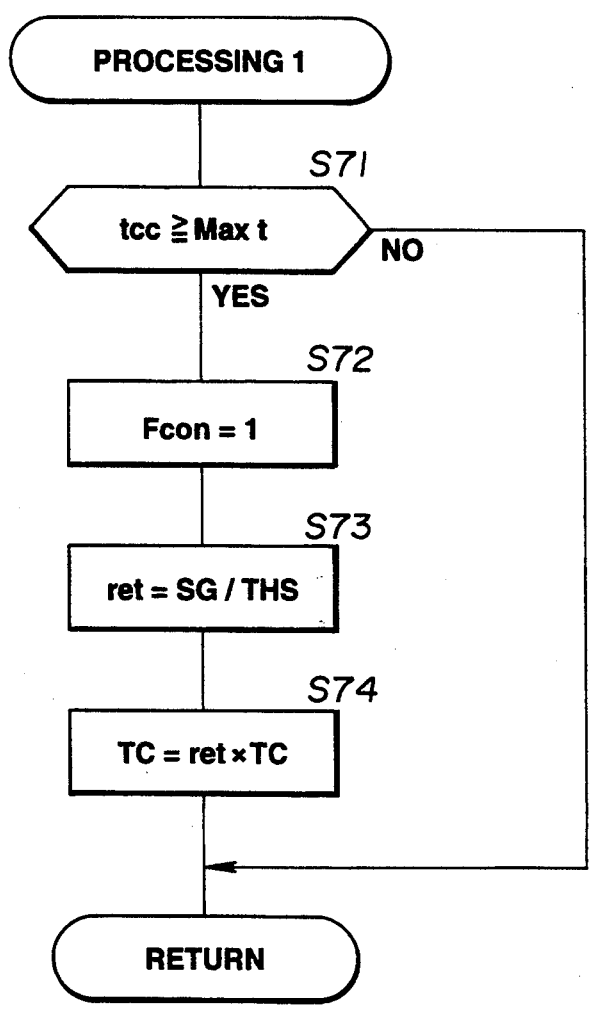
FIG. 15 is a flowchart showing a subroutine of Processing 1 in the main program of FIG. 14.

In the subroutine of FIG. 15, at a step S71, a decision is made as to whether the lapsed time tcc (from the initiation of the vehicle collision) has exceeded a predetermined time Maxt. If exceeded, the flow goes to a step S72. If not exceeded, the flow returns to the main program of FIG. 14. At a step S72, 1 is set at the flag Fcon, and then the flow goes to a step S73 at which the deceleration integrated value SG is divided by a predetermined value THS thereby to obtain a ratio ret. At a step S74, the previously set time point (timing) TC at which the integration offset OFF is changed is multiplied by the ratio ret so that the time point is changed. Then, the flow returns to the main program.

Figure 16:
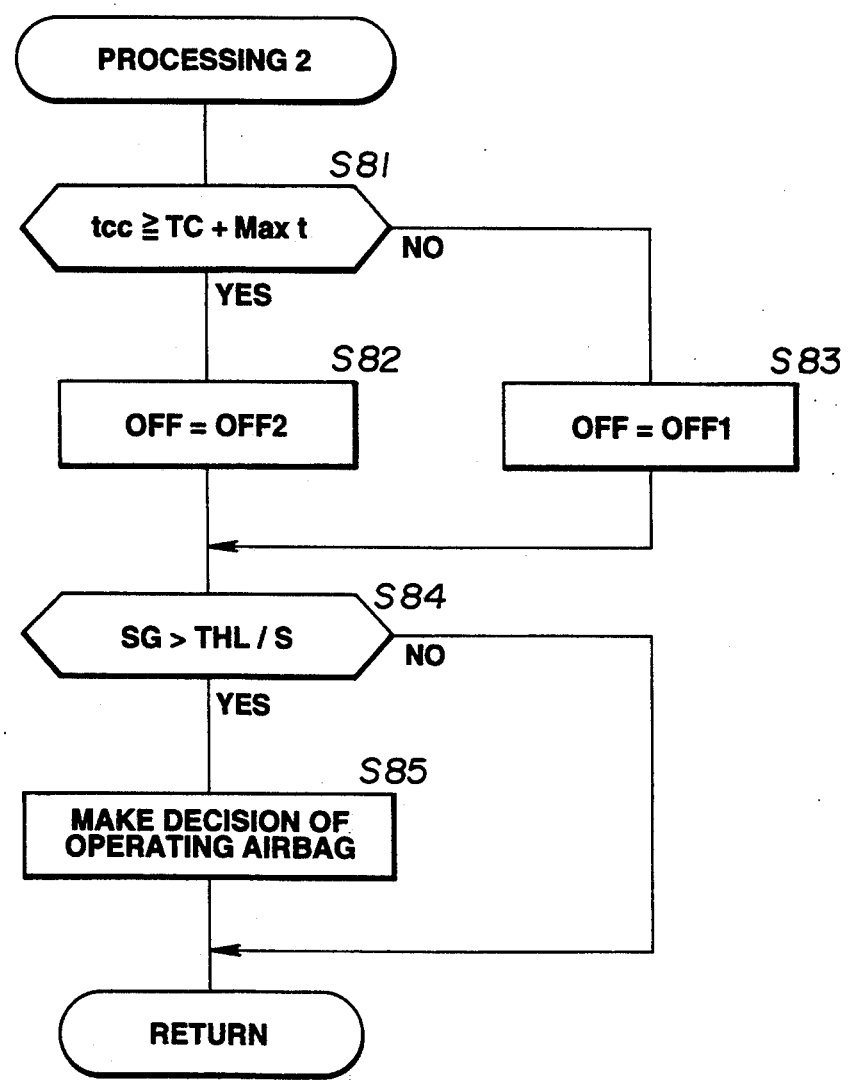
FIG. 16 is a flowchart showing a subroutine of Processing 2 in the main program of FIG. 14.

Upon returning to the main program of FIG. 14, at a step S66, a subroutine of Processing 2 shown in FIG. 16 is performed in which the integration offset OFF is changed; and a decision is made as to whether the airbag is operated (inflated) or not in accordance with a previously set threshold level THL/S.

More specifically, at a step S81 in the subroutine of FIG. 16, a decision is made as to whether the time point (TC+Maxt) at which the integration offset OFF is changed has been reached or not. If reached, the flow goes to a step S82 at which a value OFF2 is set for the integration offset OFF. If not reached, the flow goes to a step S83 at which a value OFF1 is set at the integration offset OFF. Here, a setting is made between the values OFF1 and OFF2 to establish the relationship of OFF1>OFF2. At a step S84, a decision is made as to whether the integrated value SG of the deceleration G exceeds the threshold level THL/S or not. If exceeds, the flow goes to a step S85. If not exceeded, the flow returns to the main program. At the step S85, a decision is made to operate (inflate) the airbag, and therefore the control circuit 20 outputs the operating signal to the operating circuit 40.

Figure 17:
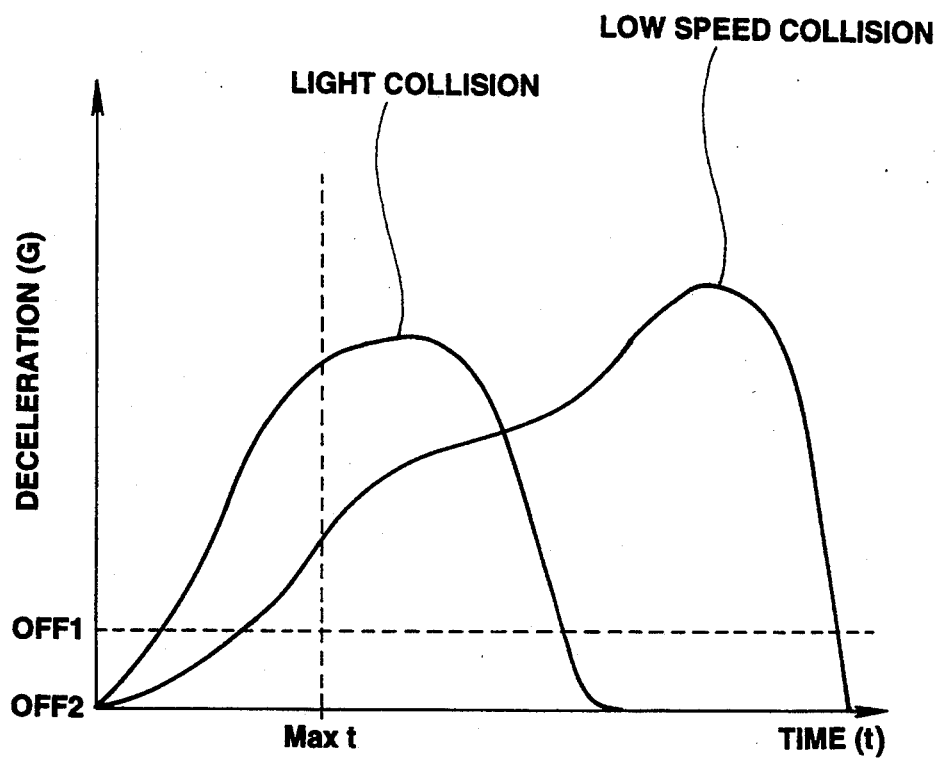
FIG. 17 is a graph showing variations in deceleration G for the two vehicle collision modes in connection with the fourth embodiment.
Figure 18:
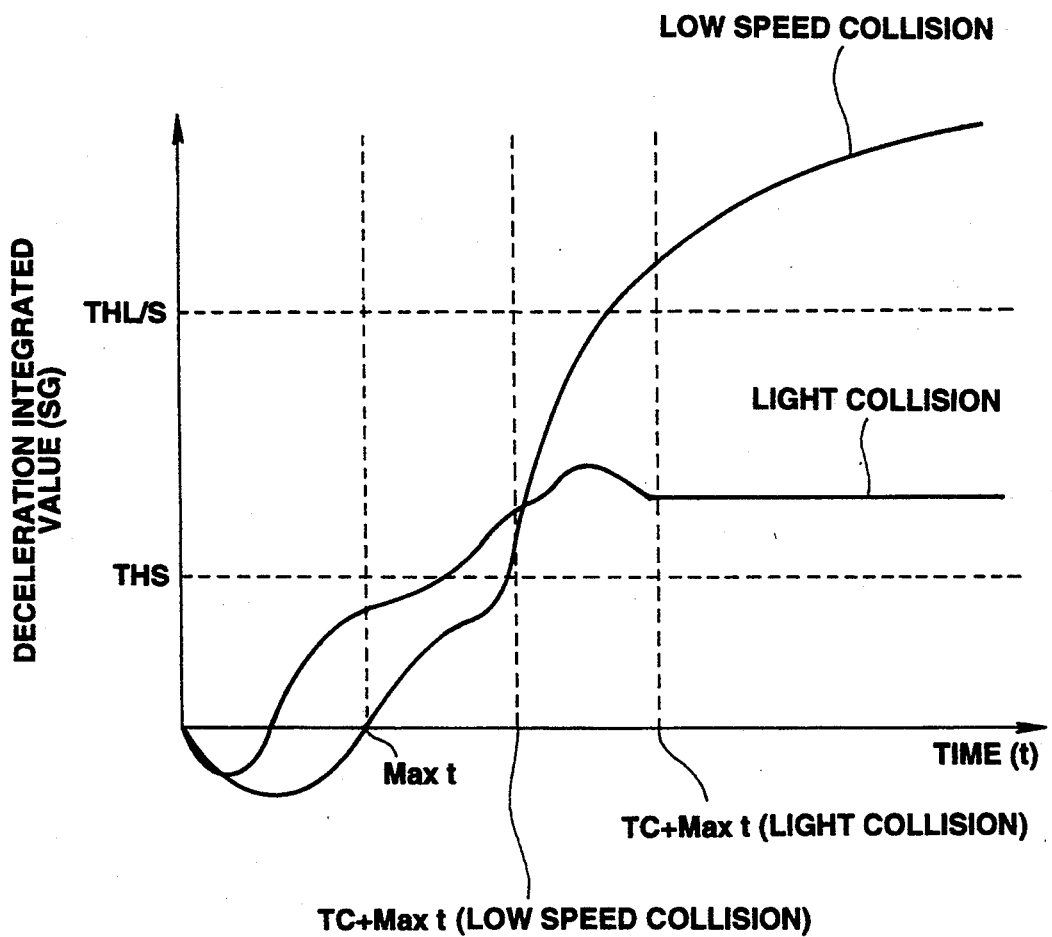
FIG. 18 is a graph showing variations in deceleration integrated value SG for the two vehicle collision modes in connection with the fourth embodiment.

Advantageous effects of the fourth embodiment control system C will be discussed with reference to FIGS. 17 and 18. FIG. 17 depicts variations in the deceleration G with respect to the light collision and the low speed collision. FIG. 18 depicts variations in the deceleration integrated value SG with respect to the two types of collisions of FIG. 17.

As apparent from FIG. 18, the ratio ret at the time point at which the time Maxt has lapsed from the initiation of the vehicle collision is smaller in the low speed collision than that in the light collision, so that the changing time point TC in the low speed collision is earlier than that in the light speed collision. Accordingly, the integration offset OFF is changed earlier in the low speed collision than that in the light collision.

Here, as shown in FIG. 17, assuming that the integration offset OFF2 is zero (0), the integration offset becomes zero earlier in the low speed collision than that in the light collision. Therefore, in case of the low speed collision, the deceleration integrated value SG rapidly increases when the time lapses over the changing time point (TC+Maxt) for the integration offset, and reaches the previously set threshold level THL/S of the deceleration integrated value SG thereby making the decision to operate (inflate) the airbag. In case of the light collision, the integration offset becomes zero later than that in the low speed collision; however, the deceleration G has already rapidly decreased at that time point (timing) and therefore the deceleration integrated value SG does not increase. Accordingly, the deceleration integrated value does not reach the threshold level THL/S, so that the airbag cannot be operated (inflated).

Thus, the fourth embodiment control system is arranged such chat the time point at which the integration offset of the deceleration G is changed is set in accordance with the integrated value SG of the deceleration G representative of a deceleration condition of the vehicle; integration is made on the value obtained by subtracting the integration offset at its state before being changed or after being changed, from the detected deceleration G; and the airbag is operated when the deceleration integrated value SG exceeds the threshold level THL/S. Therefore, the airbag can be precisely and securely operated (inflated) with respect to a variety of vehicle collisions merely upon making simple adjustments to the control system.

While only the occupant restraint system R including the airbag for a driver has been shown and described as being controlled by the control system C, it will be understood that the principle of the present invention may be applicable to other occupant restraint systems including airbag and/or seat belt and to those systems for protecting vehicle occupants on a front seat located aside the driver's seat and on a rear seat.

What is claimed is:

1. A control system for an occupant restraint system mounted on a vehicle, comprising:
   means for detecting a deceleration of the vehicle;
   means for making a decision to operate the occupant restraint system when the deceleration exceeds a predetermined threshold level;
   means for calculating a physical amount representative of a deceleration condition of the vehicle;
   means for setting a changing timing at which the threshold level is changed, in accordance with the physical amount; and
   means for changing the threshold level at the changing timing.

2. A control system as claimed in claim 1, wherein said physical amount determines the deceleration detected by said deceleration detecting means.

3. A control system as claimed in claim 2, wherein said physical amount is the deceleration detected by said deceleration detecting means.

4. A control system as claimed in claim 2, wherein said physical amount is an integrated value of the deceleration detected by said deceleration detecting means.

5. A control system as claimed in claim 2, wherein said physical amount is a differentiated value of the deceleration detected by said deceleration detecting means.

* * * * *